1
(12) United States Patent
Malkin et al.

(10) Patent No.: US 8,527,529 B2
(45) Date of Patent: Sep. 3, 2013

(54) METHODS AND APPARATUS FOR PRESENTING SEARCH RESULTS WITH INDICATION OF RELATIVE POSITION OF SEARCH TERMS

(75) Inventors: Peter K. Malkin, Ardsley, NY (US); John C. Thomas, Jr., Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/627,346

(22) Filed: Nov. 30, 2009

(65) Prior Publication Data

US 2011/0131206 A1 Jun. 2, 2011

(51) Int. Cl.
*G06F 7/00* (2006.01)
*G06F 17/30* (2006.01)

(52) U.S. Cl.
USPC .......................................................... 707/758

(58) Field of Classification Search
None
See application file for complete search history.

(56) References Cited

U.S. PATENT DOCUMENTS

| 5,623,679 | A | * | 4/1997 | Rivette et al. | 715/255 |
| 5,991,751 | A | * | 11/1999 | Rivette et al. | 1/1 |
| 6,366,934 | B1 | * | 4/2002 | Cheng et al. | 715/210 |
| 2005/0165766 | A1 | * | 7/2005 | Szabo | 707/3 |
| 2008/0177994 | A1 | * | 7/2008 | Mayer | 713/2 |
| 2009/0217168 | A1 | * | 8/2009 | Dexter et al. | 715/731 |
| 2010/0305969 | A1 | * | 12/2010 | Bacon | 705/3 |

FOREIGN PATENT DOCUMENTS

JP 2006018392 A * 1/2006

OTHER PUBLICATIONS

Lucene 2.9.1 API, Oct. 29, 2009, The Apache Software Foundation, http://lucene.apache.org/java/2_9_1/.*
Users Manual for the Examiners Automated Search Tool (EAST) Nov. 3, 2003, Computer Sciences Corporation, 2.0, i-A5.*

* cited by examiner

*Primary Examiner* — Jason Liao
(74) *Attorney, Agent, or Firm* — Ryan, Mason & Lewis, LLP (57) ABSTRACT

Methods and apparatus are provided for presenting search results with indication of relative position of search terms. According to one aspect of the invention, search results are displayed for a search query comprising a plurality of search terms. A search query is received, for example, from a user and at least one document satisfying the search query is obtained. The disclosed method determines a relative position of at least two of the search terms in the document and at least a portion of the document is presented with an indication of the relative position of the at least two search terms in the document. The relative position is indicated using a predefined character to indicate one or more intervening elements between the at least two search terms. A relevance ranking can optionally be presented that is based on the relative position of the at least two search terms.

11 Claims, 5 Drawing Sheets

Result 1

Country School Days Photo Print in Frame - eBay Individual Frames ...
Find Country School Days Photo Print in Frame in the Home - Home Decor ... if you wish your parcel to be covered from possible loss or damage in transit ...

www.site.com/Photo_Print_in-Frame

.
.
.

110

Result N

Download Photo Change Hair Software Hair Master Hair Loss ...
hair Loss - Download this small free application and get easy access to hair ... Photo Fiend is the easy to use Photo printing program that lets you print ...

www.anysite.com/Photo_Change

METHODS AND APPARATUS FOR PRESENTING SEARCH RESULTS WITH INDICATION OF RELATIVE POSITION OF SEARCH TERMS

FIELD OF THE INVENTION

The present invention relates generally to information retrieval techniques, and more particularly, to search engine techniques for presenting search results.

BACKGROUND OF THE INVENTION

As the volume of data accessible via computer continues to increase, the need for automated tools for efficient retrieval of relevant information from that data also increases. Many people use the Internet to access a wide variety of information. Search engine queries are routinely employed to find relevant information on the many web pages that are indexed by a given search engine. Generally, search engines are remotely accessible programs that perform keyword searches for information. A search query allows a user to specify his or her information needs by entering keywords or search phrases that are believed to be included in the documents of interest.

Search engines often return links to many documents that are determined to be related to the user-specified search query. The search results are usually presented in a list and are commonly called hits. The presented information may consist of web pages, images, information and other types of files. Many search engines also provide a relevance ranking, which is a relative numerical estimate of the statistical likelihood that the identified material will be of interest relative to other identified documents. Relevance rankings are often based on the number of times a keyword or search phrase appears in a document, the placement of the keywords or search phrases in the document (for example, a keyword in the title is often deemed more relevant than one at the end of the page), and the size of the document.

While existing search engines provide valuable assistance to users in locating relevant information on the World Wide Web, they suffer from a number of limitations, which if overcome, could further improve the utility and efficiency of search engines. For example, the presentation of each item in the search results is typically limited to a maximum length. Typically, when the spacing between two or more search terms in a given matching document exceeds the specified maximum length, ellipses or another character are substituted in the place of the intervening words. The ellipses, however, do not indicate the number of intervening words between the search terms. Thus, the search results often include insufficient information concerning the relative position of the search terms in the matching data objects.

A need therefore exists for an improved search engine that indicates the relative position of search terms in the matching data objects. A further need exists for an improved search engine that indicates how closely search terms are positioned in the matching data objects.

SUMMARY OF THE INVENTION

Generally, methods and apparatus are provided for presenting search results with indication of relative position of search terms. According to one aspect of the invention, search results are displayed for a search query comprising a plurality of search terms. A search query is received, for example, from a user and at least one document satisfying the search query is obtained. The disclosed method determines a relative position of at least two of the search terms in the document and at least a portion of the document is presented with an indication of the relative position of the at least two search terms in the document.

The relative position is indicated using a predefined character to indicate one or more intervening elements between the at least two search terms. The predefined characters can correspond to, for example, one or N intervening elements between the at least two search terms. Generally, the intervening elements indicated by each predefined character comprises one or more of characters, words, lines, paragraphs and pages.

In one embodiment, the relative position is indicated using a numerical indication of the number of intervening words between the at least two search terms. A relevance ranking can optionally be presented that is based on the relative position of the at least two search terms. The plurality of documents satisfying the search query can optionally be sorted based on the relevance ranking.

A more complete understanding of the present invention, as well as further features and advantages of the present invention, will be obtained by reference to the following detailed description and drawings.

DETAILED DESCRIPTION OF PREFERRED EMBODIMENTS

The present invention provides methods and apparatus for presenting search results with an indication of the relative position of the search terms in the matching data objects. The disclosed techniques provide an indication of how closely search terms are positioned in the matching data objects.

Figure 1:
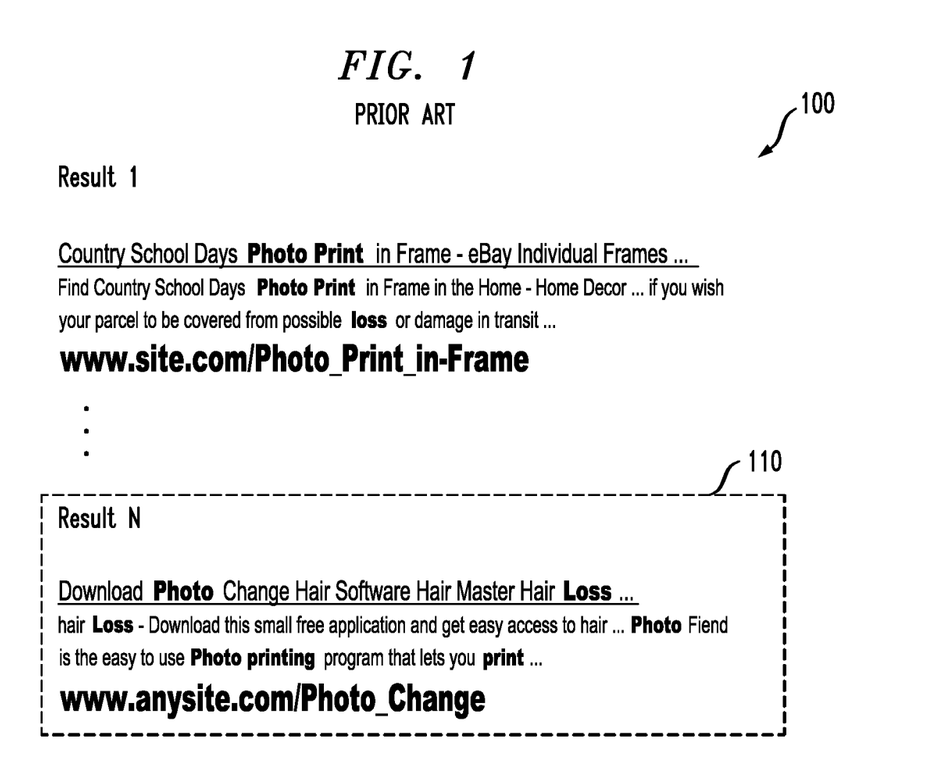
FIG. 1 illustrates an exemplary conventional occurrence-based search result display.

FIG. 1 illustrates an exemplary conventional occurrence-based search result display 100. As shown in FIG. 1, the exemplary search result display 100 comprises a listing of the documents and other objects that contain the specified search terms. In the example of FIG. 1, the exemplary search terms are "photo print loss." Typically, the matching search terms are indicated with some form of highlighting, such as bold-faced text.

As previously indicated, conventional search engines present each item in the search results with a maximum length limitation. Typically, when the spacing between two or more search terms in a given matching document exceeds the specified maximum length, ellipses or another character are substituted in the place of the intervening words. Thus, for the final matching document 110 in the example of FIG. 1, ellipses are used to separate a first string corresponding to a search term ("hair loss—Download this small free application and get easy access") and a second string ("Photo fiend is the easy to use Photo printing"). As previously noted, the ellipses do not indicate the number of intervening words between the search terms. The two strings may be widely separated within the document and are not necessarily relevant to each other.

Figure 2:
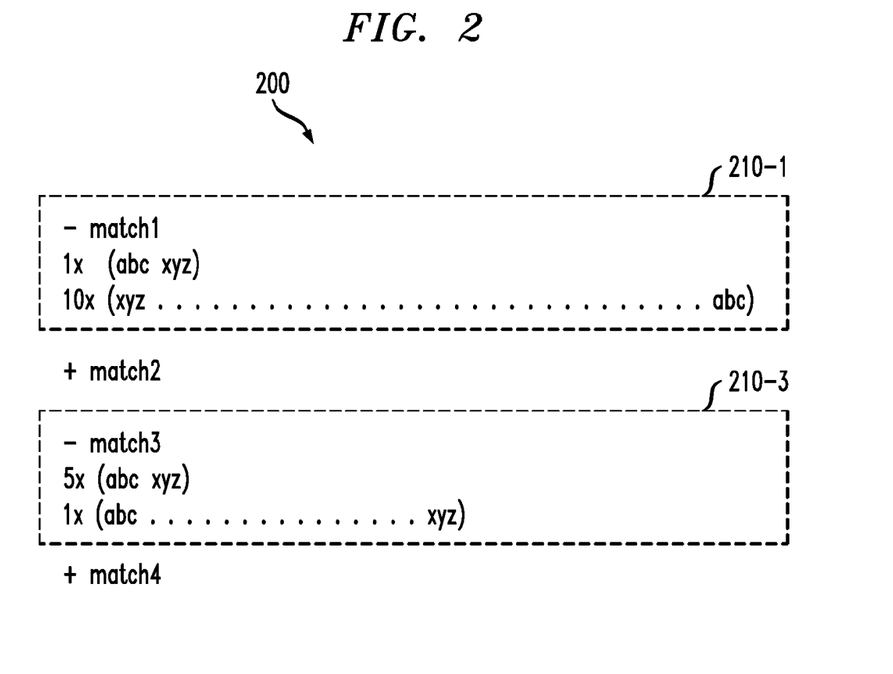
FIG. 2 illustrates an exemplary occurrence-based search result display that incorporates features of the present invention.

The present invention recognizes that search engine results can be improved by indicating the relative position of search terms in the matching data objects. FIG. 2 illustrates an exemplary occurrence-based search result display 200 that incorporates features of the present invention. As shown in FIG. 2, the exemplary search result display 200 comprises a listing of the documents and other objects that contain the specified search terms. In the example of FIG. 2, the exemplary search terms are "abc" and "xyz." The search result display 200 may be implemented using conventional search engine display techniques, as modified herein to incorporate the features and functions of the present invention.

According to one aspect of the present invention, when the spacing between two or more search terms in a given matching document exceeds the specified maximum length, a predefined character is repeated between search terms, with an indication of the relative position of the search terms. In the exemplary embodiment of FIG. 2, a predefined character, such as an ellipse, is substituted in the place of each intervening word (i.e., there is a one-to-one relationship between the predefined character and the number of intervening words). In this manner, the number of periods (ellipses) indicates the number of words intervening between the specified search terms. In a further variation of the present invention, a predefined character is substituted in the place of each set of N intervening words (i.e., there is a one-to-N relationship between the predefined character and the number of intervening words).

In the example of FIG. 2, the search results 200 comprise matching data objects Match1 through Match4. For example, Match1 through Match4 can be links to web documents that satisfy the search query. If a user were to double click one of the labels Match1 through Match4, the user's web browser would display the associated web page, in a known manner. Selecting a "+" symbol allows a user to view the details concerning a given match entry. When open, the "+" becomes a "−" and if the "−" is selected, the details are again hidden and the "−" becomes a "+."

As shown in FIG. 2, both match1 and match3 are configured to "show" the details associated with the match entry, while match2 and match4 are configured to "hide" the details. It can be seen that in the details 210-1 associated with match1 that there is only one instance in the corresponding document where "abc" is followed immediately by "xyz," while there are 10 instances same corresponding document where "xyz" is followed by "abc" but with 30 words in between. Likewise, in the details 210-3 associated with match3, it can be seen that there are 5 instances in the corresponding document of "abc" directly followed by "xyz," and one instance in the same corresponding document where "xyz" follows "abc" but only separated by 15 words. This is very likely to mean that if you are interested in documents related to "abc" followed by "xyz" (e.g., "United" followed by "States") that match3 is a better choice than match1.

The example of FIG. 2 thus inserts a number of periods to indicate the number of words intervening between/among the search terms along with the found words. For example, for a search query containing the terms "losing" and "weight," consider the search results (i) "losing.weight" compared to (ii) "losing . . . weight." One such scheme might be to indicate successive orders of magnitudes of words by incrementing the number of periods by one. The first case is likely to be about losing weight while the second case could be about almost anything.

According to a further feature of the present invention, a relevance ranking can optionally be provided for each matching entry. Generally, the disclosed relevance ranking provides a relative numerical estimate of the statistical likelihood that the identified material will be of interest relative to other identified documents, taking into account the relative position of the search terms. Thus, the disclosed relevance ranking takes into account the number of occurrences of the search terms, as well as how closely their position match that of the specified terms. In this manner, the present invention provides a means of sorting the matching documents according to which most closely match the specified search terms, taking into account not only the number of occurrences of the search terms, but how closely their position match that of the specified terms.

In one embodiment of the invention, the relevance ranking for each match (e.g., match1 through match4) is calculated by using the sum of the average of the number of periods for each match. Thus, for match1, the sum can be calculated as follows:

$$0/1 + 30/10 = 0 + 3 = 3 \qquad \text{match 1}$$

and $$0/5 + 15/1 = 0 + 15 \qquad \text{match 3}$$
$$15$$

Thus, listing the matches in order of increasing value, match1 precedes match3.

Figure 3:
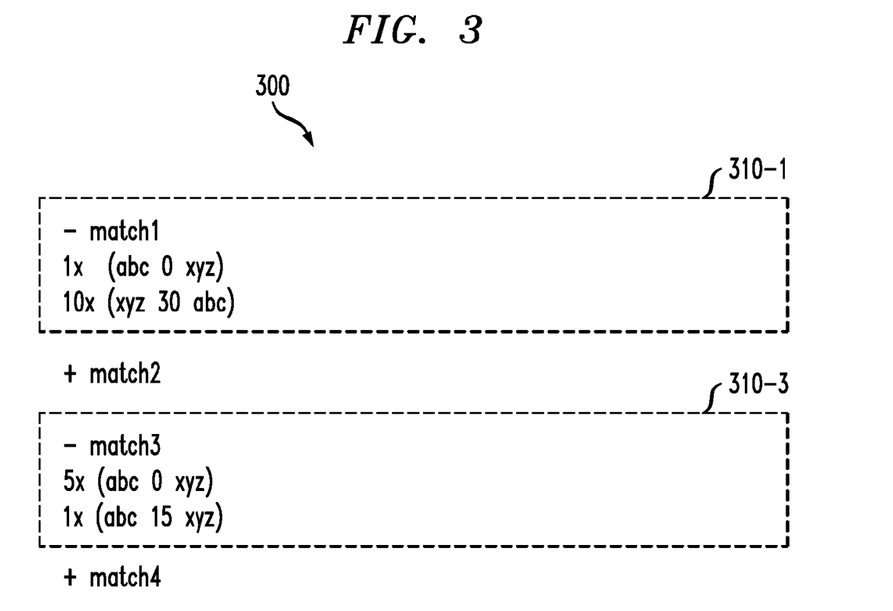
FIG. 3 illustrates an exemplary occurrence-based search result display according to an alternate embodiment of the present invention.

FIG. 3 illustrates an exemplary occurrence-based search result display 300 according to an alternate embodiment of the present invention. The embodiment of FIG. 3 explicitly specifies the number of intervening words between search terms numerically.

As shown in FIG. 3, the exemplary search result display 300 comprises a listing of the documents and other objects that contain the specified search terms. In the example of FIG. 3, the exemplary search terms are again "abc" and "xyz." The search result display 300 may again be implemented using conventional search engine display techniques, as modified herein to incorporate the features and functions of the present invention.

According to another aspect of the present invention, when the spacing between two or more search terms in a given matching document exceeds the specified maximum length, the relative position of the search terms is indicated numerically. In this manner, a numerical indication is provided of the number of words intervening between the specified search terms.

In the example of FIG. 3, the search results 300 again comprise matching data objects Match1 through Match4. It can be seen that in the details 310-1 associated with match1 that there is only one instance in the corresponding document where "abc" is followed immediately by "xyz," while there are 10 instances in the same corresponding document where "xyz" is followed by "abc" with 30 words in between. Likewise, in the details 310-3 associated with match3, it can be seen that there are 5 instances in the corresponding document of "abc" directly followed by "xyz," and one instance in the same corresponding document where "xyz" follows "abc" separated by 15 words. This is very likely to mean that if you are interested in documents related to "abc" followed by "xyz" (e.g., "United" followed by "States") that match3 is a better choice than match1.

The example of FIG. 3 thus inserts the number of words intervening between/among the search terms along with the found words. For example, for a search query containing the terms "losing" and "weight," consider the search results (i) "losing" (3) "weight" compared to (ii) "losing" (5433) "weight." The first case is likely to be about losing weight while the second case could be about almost anything.

Figure 4:
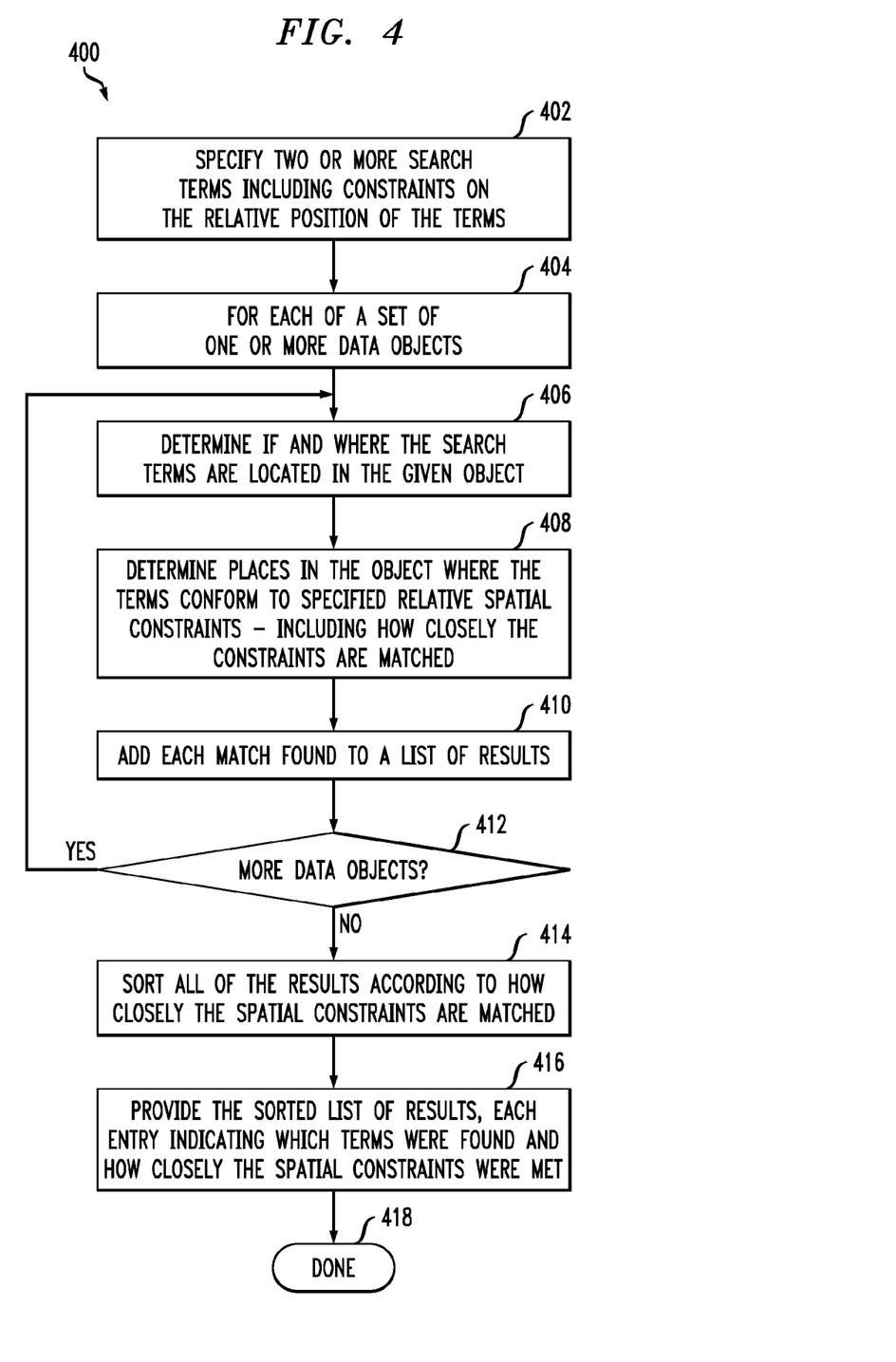
FIG. 4 is a flow chart describing an exemplary implementation of a relative position search term presentation process incorporating features of the present invention.

FIG. 4 is a flow chart describing an exemplary implementation of a relative position search term presentation process 400 incorporating features of the present invention. As shown in FIG. 4, the relative position search term presentation process 400 initially receives a search query during step 402 comprising a user specification of two or more search terms. The search query optionally includes one or more constraints on the relative position of the search terms.

Thereafter, the relative position search term presentation process 400 starts a loop during step 404 for each of a set of one or more data objects. During step 406, the relative position search term presentation process 400 determines if and where the search terms are located in the given object, and then determine places in the object where the terms conform to any specified relative spatial constraints during step 408, including how closely the constraints are matched. Each match found is added to a list of results during step 410.

A test is performed during step 412 to determine if there are more data objects to process. If it is determined during step 412 that there are more data objects to process, then program control returns to step 406. If, however, it is determined during step 412 that there are not more data objects to process, then the results are sorted during step 414 according to how closely the spatial constraints are matched.

The sorted list of results is provided during step 416, with each entry indicating which terms were found and how closely the spatial constraints were met. Program control terminates during step 418.

Figure 5:
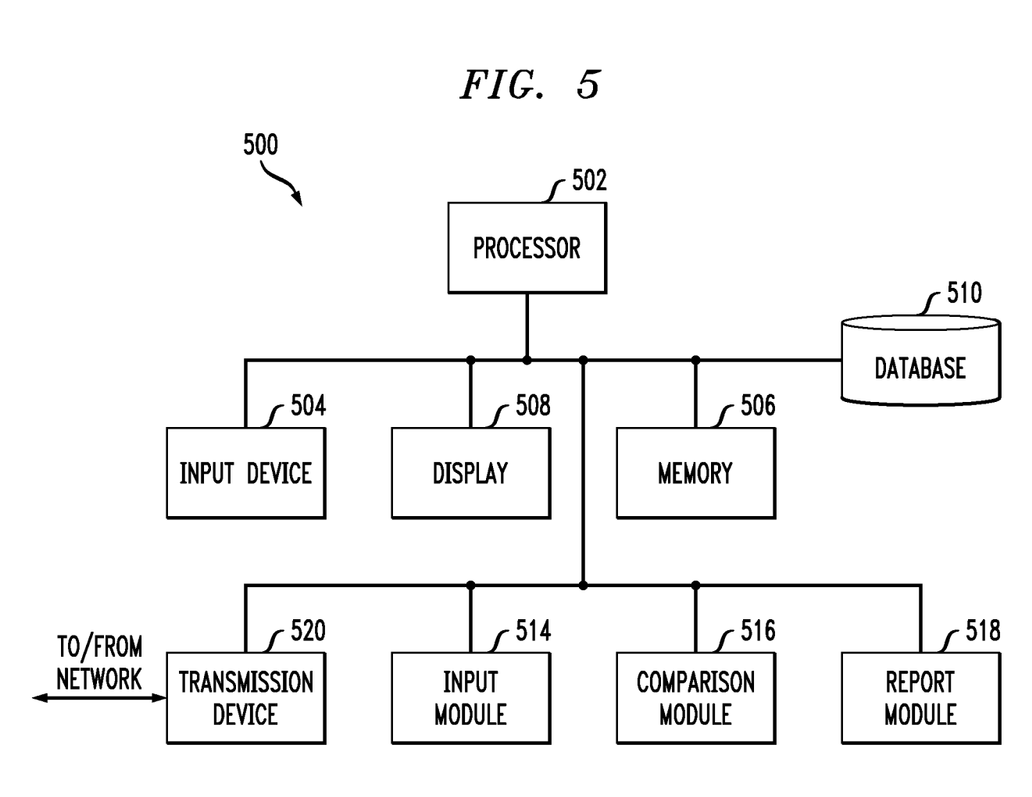
FIG. 5 is an architectural diagram illustrating system components of one embodiment of the present invention.

FIG. 5 is an architectural diagram illustrating system components of one embodiment of the present invention. The system 500 may include one or more processors 502 for executing the functions or functionalities of the present disclosure. Using an input device 504 such as a keyboard, mouse, touch screen or another input device, a user may enter a search query. The system 500 may also include one or more memory devices 506 for storing one or more modules or instructions implementing the functionalities of the present invention, such as the relative position search term presentation process 400 of FIG. 4, for the processor 502 to execute. The system 500 may also include a display device 508 for presenting user interfaces to a user, including the exemplary search result displays of FIGS. 2 and 3 of the present invention.

A database 510 stores the data objects, such as documents, that are searched by the relative position search term presentation process 400. The database 510 can be local or remote, relative to one or more of the remaining components of system 500. A transmission device 520, such as a modem, allows the system 500 to communicate over one or more networks, such as the World Wide Web, with one or more remote devices (not shown), such as one or more servers storing data objects and/or a search engine. An input module 514 provides the input functions of an exemplary embodiment of the present invention, as described above in conjunction with step 402 of FIG. 4. A comparison module 516 provides the comparison functions of an exemplary embodiment of the present invention, as described above in conjunction with FIG. 4. A report module 518 allows a user to generate one or more reports based on the output of the relative position search term presentation process 400 of FIG. 4.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
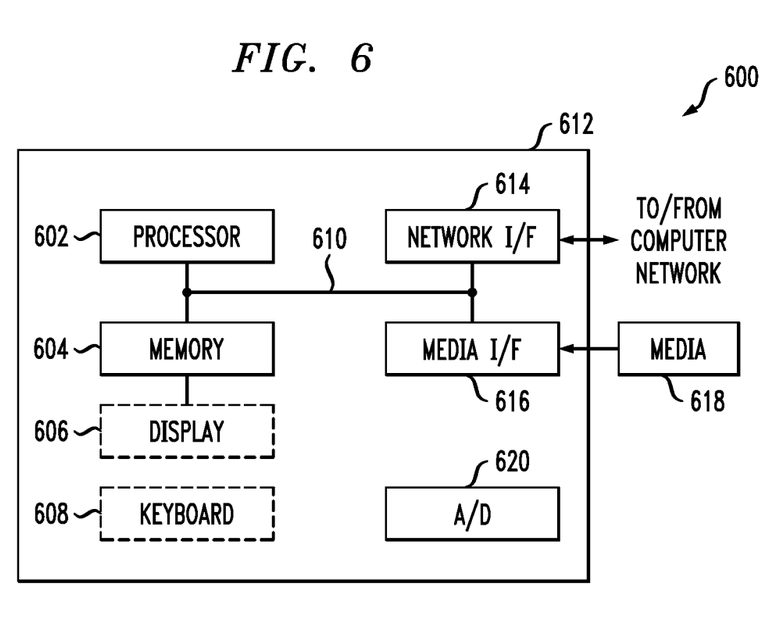
FIG. 6 illustrates a computer system that can implement one or more aspects and/or elements of the present invention.

One or more embodiments can make use of software running on a general purpose computer or workstation. FIG. 6 depicts a computer system 600 that may be useful in implementing one or more aspects and/or elements of the present invention. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Analog-to-digital converter(s) 620 may be provided to receive analog input, such as analog video feed, and to digitize same. Such converter(s) may be interconnected with system bus 610.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is anon-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 602. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for displaying search results for a search query comprising a plurality of search terms, said method comprising:
   receiving said search query;
   obtaining at least one document satisfying said search query;
   determining a relative position of at least two of said search terms in said at least one document; and
   presenting at least a portion of said at least one document with a visual indication of said relative position of said at least two search terms in said at least one document, wherein said visual indication indicates a count of one or more intervening elements between said at least two search terms and wherein one or more steps of said method are performed by one or more hardware devices, wherein said relative position is indicated using a predefined character to indicate said one or more intervening elements between said at least two search terms and wherein said one or more intervening elements indicated by each predefined character comprises a given one of a character, word, line, paragraph and page.

2. The method of claim 1, wherein said relative position is indicated using a numerical indication of the number of intervening words between said at least two search terms.

3. The method of claim 1, further comprising the step of presenting a relevance ranking that is based on said relative position of said at least two search terms.

4. The method of claim 3, further comprising the step of sorting a plurality of documents satisfying said search query based on said relevance ranking.

5. The method of claim 1, wherein said search query comprises one or more constraints on a relative position of at least two search terms.

6. A computer program product for displaying search results for a search query comprising a plurality of search terms, said computer program product comprising a non-transitory computer readable medium having computer readable program code embodied therewith, said computer readable program code comprising:
   computer readable program code configured to receive said search query;
   computer readable program code configured to obtain at least one document satisfying said search query;
   computer readable program code configured to determine a relative position of at least two of said search terms in said at least one document; and
   computer readable program code configured to present at least a portion of said at least one document with a visual indication of said relative position of said at least two search terms in said at least one document, wherein said visual indication indicates a count of one or more intervening elements between said at least two search terms, wherein said relative position is indicated using a predefined character to indicate said one or more intervening elements between said at least two search terms and wherein said one or more intervening elements indicated by each predefined character comprises a given one of a character, word, line, paragraph and page.

7. The computer program product of claim 6, wherein said relative position is indicated using a numerical indication of the number of intervening words between said at least two search terms.

8. The computer program product of claim 6, further comprising the step of presenting a relevance ranking that is based on said relative position of said at least two search terms.

9. The computer program product of claim 8, further comprising the step of sorting a plurality of documents satisfying said search query based on said relevance ranking.

10. The computer program product of claim 6, wherein said search query comprises one or more constraints on a relative position of at least two search terms.

11. An apparatus for displaying search results for a search query comprising a plurality of search terms, comprising:
   a memory; and
   at least one processor, coupled to the memory, operative to:
   receive said search query;
   obtain at least one document satisfying said search query;
   determine a relative position of at least two of said search terms in said at least one document; and present at least a portion of said at least one document with a visual indication of said relative position of said at least two search terms in said at least one document, wherein said visual indication indicates a count of one or more intervening elements between said at least two search terms, wherein said relative position is indicated using a predefined character to indicate said one or more intervening elements between said at least two search terms and wherein said one or more intervening elements indicated by each predefined character comprises a given one of a character, word, line, paragraph and page.

\* \* \* \* \*